(12) United States Patent
Porter

(10) Patent No.: US 8,197,571 B2
(45) Date of Patent: Jun. 12, 2012

(54) AIR FILTER WITH IMPROVED STRUCTURAL SUPPORT

(75) Inventor: Dennis R. Porter, Columbia, MO (US)

(73) Assignee: AAF-McQuay Inc., Louisville, KY (US)

( * ) Notice: Subject to any disclaimer, the term of this patent is extended or adjusted under 35 U.S.C. 154(b) by 295 days.

(21) Appl. No.: 12/475,053

(22) Filed: May 29, 2009

(65) Prior Publication Data

US 2010/0300052 A1  Dec. 2, 2010

(51) Int. Cl.
*B01D 46/00* (2006.01)

(52) U.S. Cl. .................. 55/499; 55/497; 55/521

(58) Field of Classification Search ........... 55/497, 55/499, 500–501, 503, 521, 528, DIG. 5, 55/DIG. 31, 385.1, 485–486, 563
See application file for complete search history.

(56) References Cited

U.S. PATENT DOCUMENTS

| | | | |
|---|---|---|---|
| 2,058,669 A | 10/1936 | Dollinger | |
| 3,679,057 A | 7/1972 | Perez | |
| 3,871,851 A | 3/1975 | Neumann | |
| 4,547,950 A | 10/1985 | Thompson | |
| 4,617,122 A | 10/1986 | Kruse et al. | |
| 5,273,563 A | 12/1993 | Pasch et al. | |
| 5,863,482 A | 1/1999 | Schlor et al. | |
| 5,958,097 A | 9/1999 | Schlor et al. | |
| 6,254,653 B1 | 7/2001 | Choi et al. | |
| 6,398,839 B2 | 6/2002 | Choi et al. | |
| 6,521,011 B1 | 2/2003 | Sundet et al. | |
| 6,709,480 B2 | 3/2004 | Sundet et al. | |
| 6,740,136 B2 | 5/2004 | Duffy | |
| 7,156,891 B2 | 1/2007 | Winters et al. | |
| 7,217,333 B2 | 5/2007 | Sundet et al. | |
| D544,949 S | 6/2007 | Winters et al. | |
| 2005/0204714 A1 | 9/2005 | Sundet et al. | |
| 2006/0053759 A1 | 3/2006 | Winters et al. | |

FOREIGN PATENT DOCUMENTS

FR  82598  3/1964

OTHER PUBLICATIONS

European Patent Office; Extended European Search Report and Written Opinion; Aug. 2, 2010; pp. 1-8; European Patent Office.

*Primary Examiner* — Duane Smith
*Assistant Examiner* — Karla Hawkins
(74) *Attorney, Agent, or Firm* — Middleton Reutlinger; Chad D. Bruggeman; John F. Salazar

(57) ABSTRACT

An air filter having an improved structural support. A pleated air filter having a plurality of truncated pleat tips and sloping side surfaces along a front face and rear face. The truncated pleat tips are orientated perpendicular to the direction of pleating. A reinforcing support member oriented in the direction of pleating and substantially contouring and connecting to the face of the pleated air filter and thereby having truncated pleat tips orientated perpendicular to the direction of pleating. A reinforcing strip connected to the truncated pleat tips of the reinforcing member along the face of the air filter and another reinforcing strip located on the opposite face of the air filter and connected to the truncated pleat tips of the filter to form a truss structure.

20 Claims, 4 Drawing Sheets

AIR FILTER WITH IMPROVED STRUCTURAL SUPPORT

TECHNICAL FIELD

The present invention relates to an air filter and particularly to an air filter with an improved structural support.

DETAILED DESCRIPTION

Figure 1:
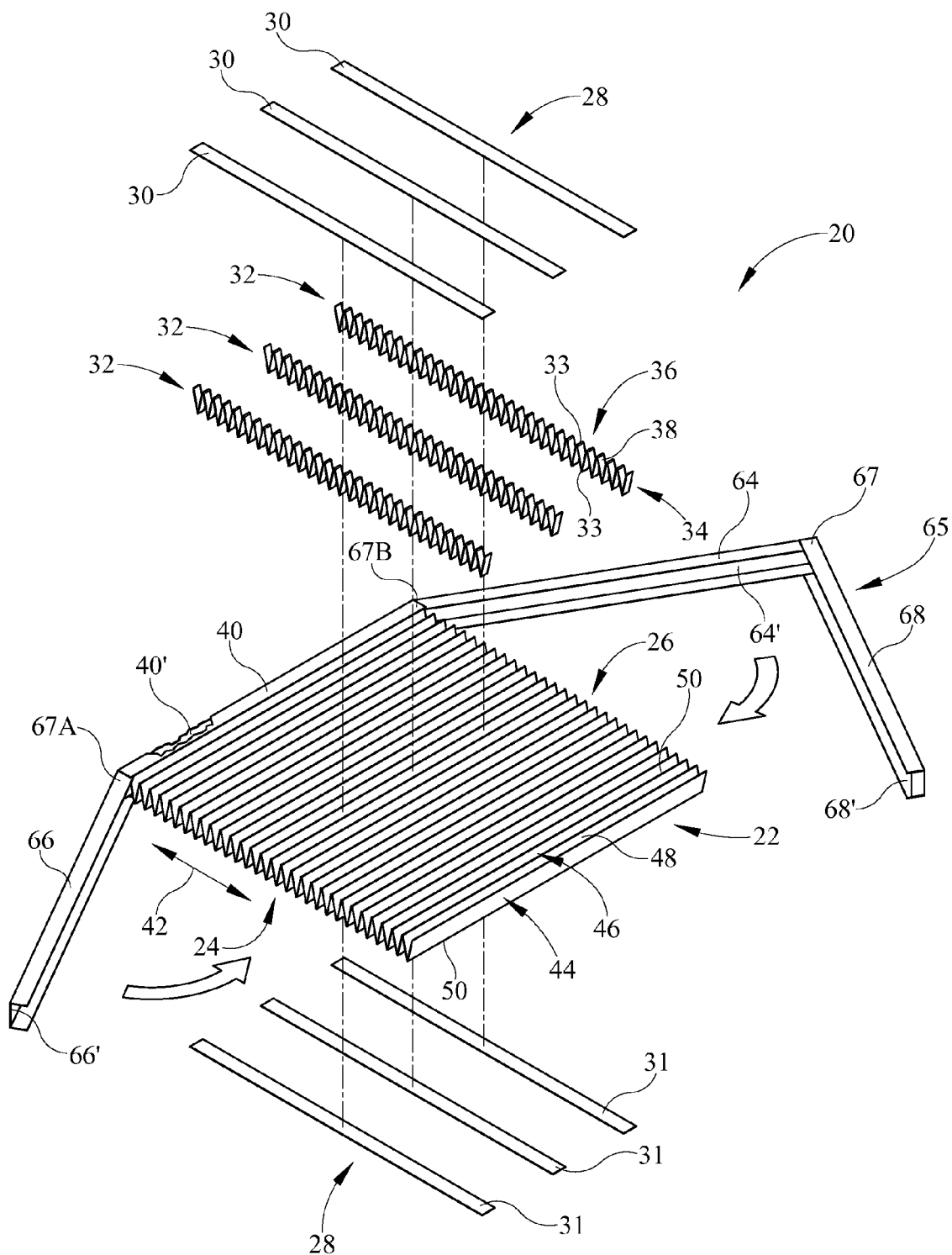
FIG. 1 shows an exploded, perspective view of an embodiment of an air filter with a portion of the frame member partially broken away.

It is to be understood that the invention is not limited in its application to the details of construction and the arrangement of components set forth in the following description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," "in communication with" and "mounted," and variations thereof herein are used broadly and encompass direct and indirect connections, couplings, and mountings. In addition, the terms "connected" and "coupled" and variations thereof are not restricted to physical or mechanical connections or couplings.

Furthermore, and as described in subsequent paragraphs, the specific mechanical configurations illustrated in the drawings are intended to exemplify embodiments of the invention and that other alternative mechanical configurations are possible.

Referring to FIGS. 1-4, an air filter 20 includes a filter media element 22 having a plurality of "fan-folded" or "accordion folded" pleats 44. Each pleat is defined by a section of two-sided or planar filter media that is folded. Each fold defines a truncated pleat tip 46 between adjacent sloping side surfaces 48 along a front face 24 and a rear face 26. Truncated pleat tips 46 are oriented perpendicular to the direction of pleating 42. Each pleat tip has a planar tip portion 50 that is formed between dual score lines formed in the media and in the reinforcing members 32. Dual score lines allow the combined filter material to be folded at each score line setting a flat tip portion 50 as shown. As shown in FIG. 1, one or more reinforcing members or support structures 32 have a plurality of "fan-folded" or "accordion folded" pleats 34. Each pleat is defined by a section of two-sided or planar support member that is folded. Each double score line fold defines a truncated pleat tip 36 between adjacent sloping side surfaces 38 along each face. Truncated pleat tips 36 are oriented perpendicular to the direction of pleating 42. Each pleat tip 36 has a planar tip portion 33 that is formed between dual score lines formed in the media and in the reinforcing members 32. Dual score lines allow the combined filter material to be folded at each score line setting a flat tip portion 33.

One embodiment of making the self-supporting pleated filter includes placing one or more of the reinforcing member or support structures 32 in the direction of pleating along the rear face 26 of the filter media 22. However, it should be understood that reinforcing members 32 may be positioned along either the rear face 26 or front face 24, or both the front and rear face. Any of the reinforcing members herein may be used along the front face of the filter media, as a result the reinforcing member may be positioned upstream or downstream in the air flow. Each reinforcing member 32 is connected or bonded to the filter media 22. Reinforcing member 32 may be bonded to the media 22 using a variety of techniques, such as adhesive bonding including hot melt EVA adhesive, thermal bonding, solvent bonding, or ultrasonic bonding. The adhesive between reinforcing member and media may be applied, but is not limited to, a continuous line of adhesive. Reinforcing member 32 may be a strip about ⅝ inches to about 1.0 inches wide and about 0.028 inches thick. Filter media 22 is about 0.06 inches to about 0.1 inches thick. The filter media 22 and each reinforcing member 32 may together be formed in a pleating operation, using a double score line device, resulting in pleats being simultaneously formed in each reinforcing member and filter media. However, the filter media 22 and reinforcing member 32 may be pleated by dual score lines separately from each other and subsequently assembled. The resulting pleated filter media 22 includes truncated pleat tips 46 while the resulting reinforcing member 32 includes truncated pleat tips 36. Pleat spacing and depth may be varied depending on the particular application. The pleated material enters into a chamber that heat sets the pleats. The actual spacing of the pleats is controlled by a slat type conveyor with a fin contacting the inside of each vertical pleat. This spacing is controlled while top and bottom reinforcing strips 30 and 31 are applied, such as by adhesive or other methods described above, to the truncated pleat tips 36 of the reinforcing members 32 along the rear face 26 and also to truncated pleat tips 46 of the filter media 22 along the front face 24 respectively. Reinforcing strips 30 and 31 may be about 0.028 inches thick and may be larger or substantially the same width as each reinforcing member 32. Upon combining of the filter media, reinforcing member and reinforcing strip assembly, the pack assembly advances into a cutoff station that finishes the pack assembly to a desired length.

Figure 2:
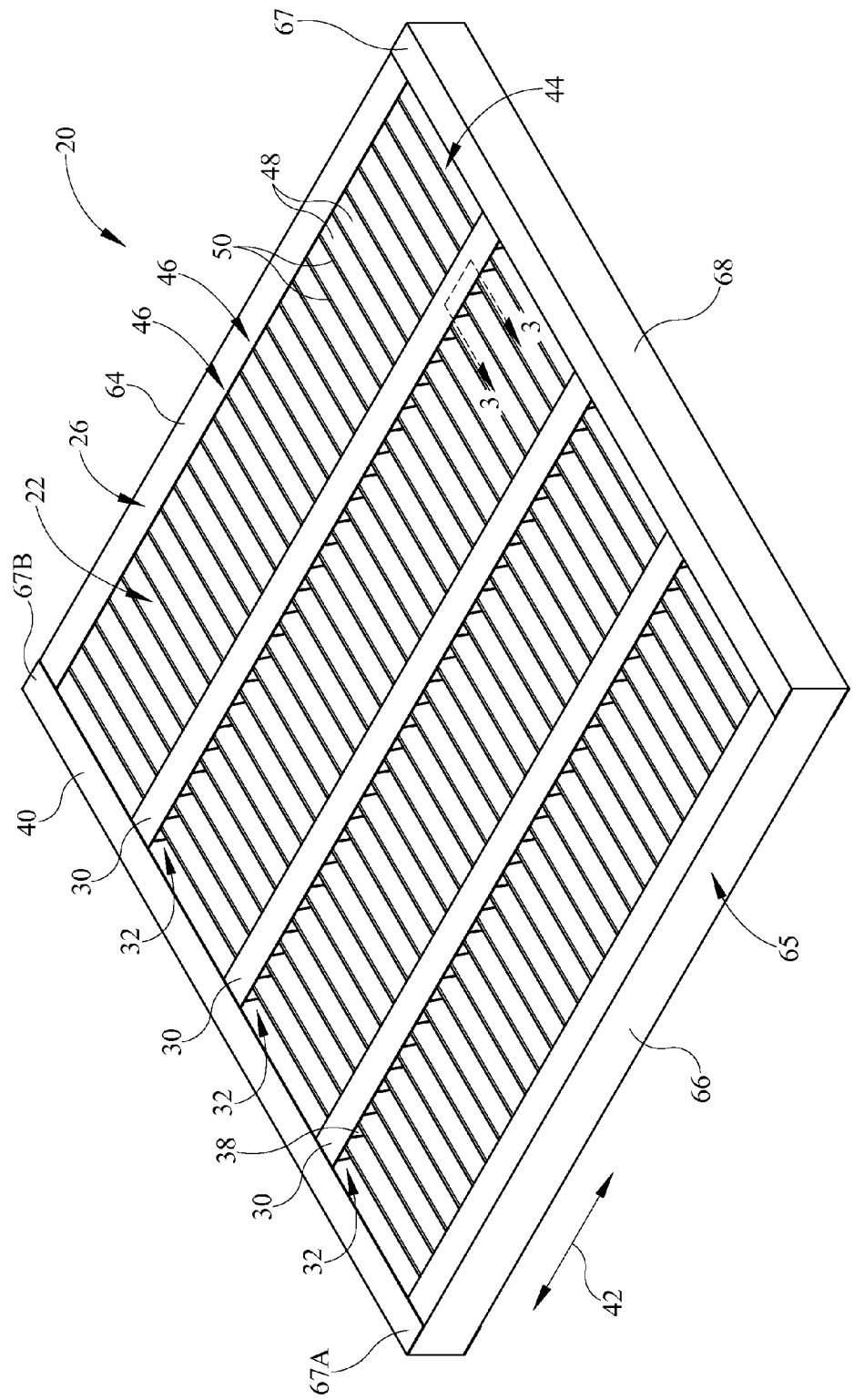
FIG. 2 shows a rear perspective view of the assembled air filter of FIG. 1.

Frame material may then be applied to the air filter package. As shown in FIGS. 1 and 2, air filter 20 includes a plurality of frame members that support the media element 22. The frame members include opposing side frame members 64, 66 and opposing end frame members 68, 40. As shown in FIG. 2, the respective side frame members 64, 66 each of which has a channel 64', 66' and the end frame members 68, 40 each of which has a channel 68', 40' are orthogonal to each other when assembled. The respective sides of filter media 22 are secured within channels 64', 66', 68', and 40' of the frame members 64, 66, 68, 40 in any conventional manner that will provide a leak-proof seal between the media and each respective channel 64', 66', 68', and 40'. Air filter 20 can also include one or more planar reinforcing strips 28 on both the top and bottom surfaces of the filter 20. The top or first reinforcing strip is identified by reference numeral 30 whereas the bottom or second reinforcing strip is identified by reference numeral 31. The opposing distal ends of reinforcing strips 28 are also connected to surfaces of the end frame sections 68, 40. It will be recognized by those of ordinary skill in the art that reinforcing strips 28 should extend in the direction of pleating 42. Those of ordinary skill in the art will also recognize that the planar reinforcing strips 28 do not need to be planar and that other cross-sectional shapes could also be used. Square, circular, L-shaped, triangular, or rectangular cross sections should all be considered equivalent embodiments. For claim construction purposes, the term "planar reinforcing strip" and "reinforcing strip" should be construed to include at least all of the above-identified geometries.

Figure 4:
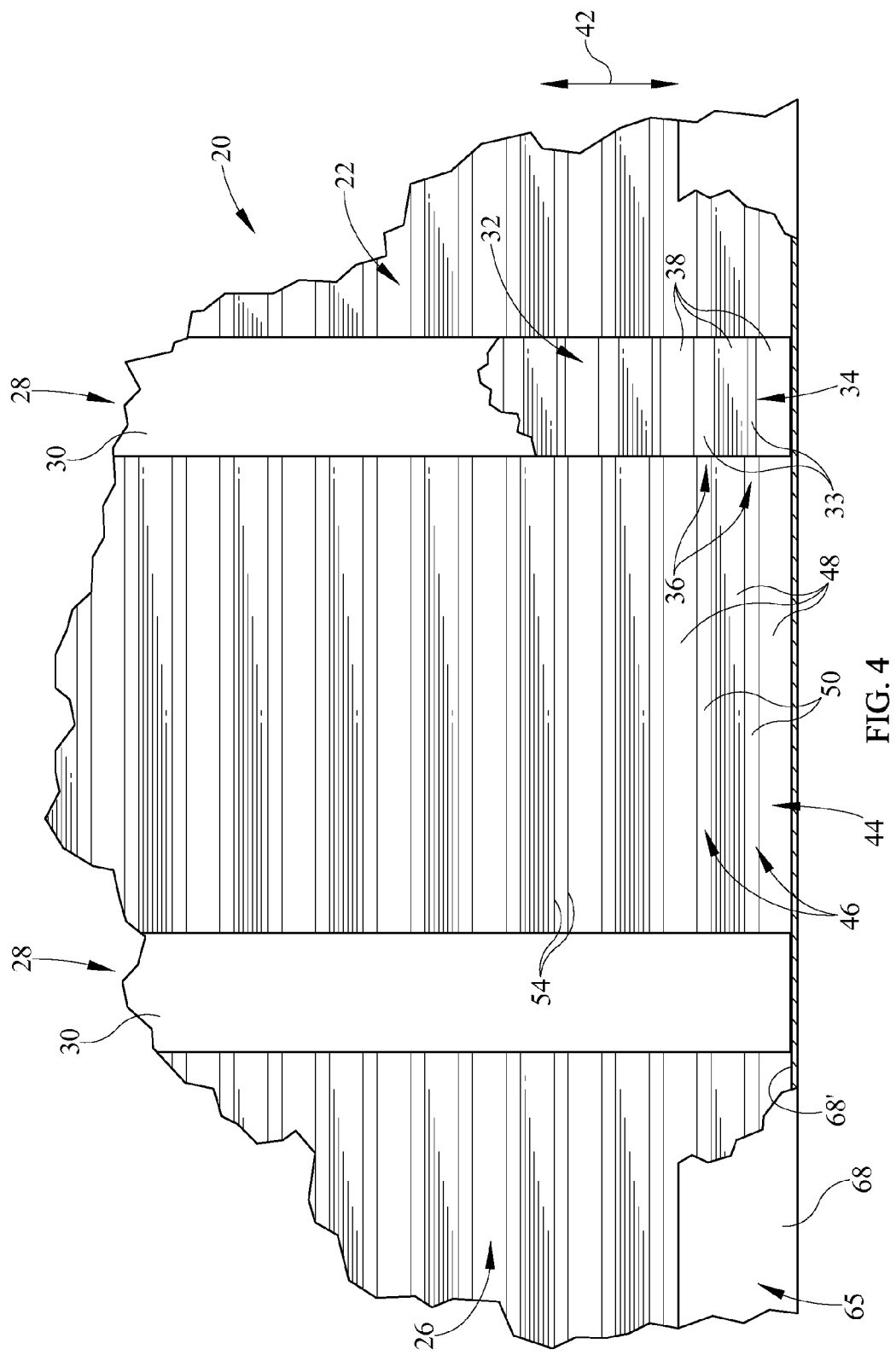
FIG. 4 shows an enlarged, partial top view of the assembled air filter of FIG. 2 with portions of the frame and reinforcing member partially broken away.

As shown in FIGS. 1, 2, and 4, frame member 64 is bounded at one end by a corner 67 as shown. Frame member 68 extends from the corner 67, substantially orthogonal to the first frame member 64. The two frame members 64 and 68 form an "L"-shaped assembly by the frame members 64 and 68 being fixedly attached to each other at the corner 67. The other frame members 66 and 40 and 64 and 40 may be hinged however, to allow the frame into which the filter media is installed to be opened and/or closed. Members 66 and 40 are each hingedly attached to each other. At a first hinge 67A allowing member 66 to swing closed as shown in FIG. 1. A second hinge 67B between frame members 64 and 40 also allows fixed members 64 and 68 to swing closed as shown in FIG. 1. The connection between members 66 and 68 allows them to be separated or assembled when needed. Closing members 66 and 64 using the two hinges 67A and 67B allows the four members 64, 66, 68 and 40 to form a removable or nonremovable frame for the filter assembly.

As more specifically shown in FIGS. 1-4, filter 20 includes one or more reinforcing members or support structures 32, each having a top reinforcing strip 30 and/or bottom reinforcing strip 31. Each top reinforcing strip 30 is located over each reinforcing member 32, and opposite each bottom reinforcing strip 31 to form a truss structure as more specifically shown in FIG. 3. The truss structure thus becomes an integral part of the filter improving the overall rigidity of the product. The truss structure adds increased strength to the central portion of the media 22 which is otherwise typically difficult to reinforce due to the distance of the central portion from the supporting frame 65. Thus increased structural rigidity of the filter pack allows the filter to be maintained in service for a longer time interval, lowering the overall operational cost of the system by extending filter life. Each reinforcing member 32 is oriented in the direction of pleating 42. Each planar top reinforcing strip 30 is oriented in the direction of pleating 42 and abuts the planar tip portions 33 of the reinforcing member 32 along the rear face 26. Each planar bottom reinforcing strip 31 is oriented in the direction of pleating 42 and is connected to the planar tip portions 50 along the front face 24. Preferably, the top and bottom reinforcing strips 30, 31 extend over and are connected to opposing end frame sections 68, 40 to provide additional support, as shown in FIGS. 2 and 4. Although a specific frame configuration is shown in the drawings, it is to be understood that other configurations of the frame are within the scope and contemplation of the embodiments of the invention. For example, the frame construction may be a one piece wrapper rather than connected multiple pieces.

Those of ordinary skill in the art will recognize that the frame members, the planar reinforcing strips, and the pleat reinforcing member can each be made out of paper, metal, or plastic as needed by the application in which the filter 20 is to be used. The material forming reinforcing strips, reinforcing members, and frame members may be, but is not limited to, 0.028 inch thick clay coated, beverage board stock.

FIG. 2 illustrates the rear face 26 of air filter 20 as assembled in accordance with FIG. 1. Filter media 22 is disposed within a volume defined by the aforementioned frame members 64, 66, 68, 40 and provided with an airtight seal so that when the filter 20 is installed into an air stream, the applied air stream passes through the air filter 20 instead of around it. Each reinforcing member 32 is located to align with each corresponding top reinforcing strip 30 and bottom reinforcing strip 31, and to contour to the pleats 44 of filter media 22 along the rear face 26, thereby providing support for the filter media 22. As the terms are used herein, an air stream that impinges on the front face 24, passes through the media 22 from the front face 24 and exits the filter 22 from the rear face 26.

Figure 3:
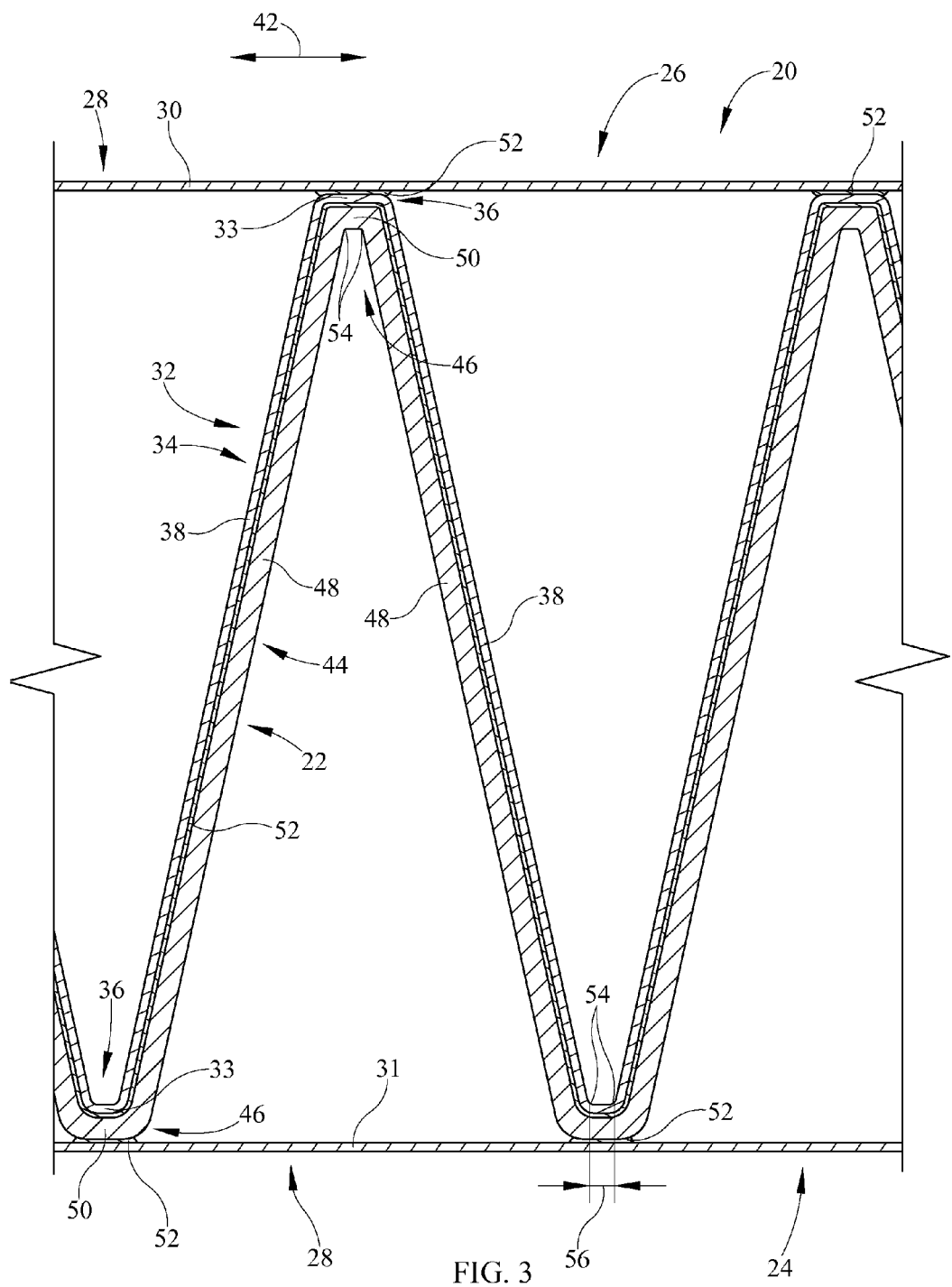
FIG. 3 shows an enlarged, partial sectional view of the air filter of FIG. 2 taken along line 3-3.

FIG. 3 is a partial sectional view of the air filter 20 of FIG. 2 taken along line 3-3 and more clearly illustrates the configuration of the filter media 22, top and bottom reinforcing strips 30, 31, and the reinforcing member 32. The filter media 22 may be constructed of any material to provide the desired filtration characteristics of an intended application such as but not limited to paper, porous films of thermoplastic or thermoset materials, nonwoven webs of synthetic or natural fibers, scrims, woven or knitted materials, foams, or electret or electrostatically charged materials. The filter media 22 may also include sorbents, catalysts, and or activated carbon (granules, fibers, fabric, and molded shapes). One such construction may include a composition of one hundred percent (100%) low melt fibers. It will be recognized by those of skill in the art that various different filter media structural compositions may be successfully used in connection with the present embodiment.

As set forth above and shown in FIG. 3, filter media 22 has a plurality of pleats 44, each pleat having a pleat tip 46 between the sloping side surfaces 48 the shape of which is reminiscent of an accordion bellows. The reinforcing members 32 have a plurality of pleats, each pleat having a truncated pleat tip 36 between adjacent sloping side surfaces 38. The planar tip portions 50, 33 are defined by folding the media 22 and reinforcing member 32 at each of the dual score lines 54 that are scored, cut or otherwise formed in the filter media 22 and in the reinforcing members 32, respectively. The score lines 54 may be depressions or compressions of the media 22 and reinforcing members 32, or cuts or slices in the media 22 and reinforcing members 32 that do not extend completely through the media and reinforcing members. By folding the media and reinforcing members twice, i.e., at both score lines, a substantially flat or planar tip portion 50, 33 is formed in the filter media and reinforcing members to aid in forming a crisp fold and a truncated pleat tip 46, 36. The score lines 54 are spaced by a dimension represented by the arrows 56. Dimension 56 may be, but is not limited to, a range between about 3/32 inches and 1/4 inches, preferably 1/8 inches. However, it will be recognized by those of skill in the art that the dimension 56 may be adjusted and/or varied according to the needs of a particular application, for example to provide planar tip portions 50 and 33 of different widths. It will be further recognized that the dimension 56 may be different for pleats on the front face in comparison to the pleats on the rear face.

As shown in FIG. 3, the planar tip portions 50, 33 provide a substantially flat area on which an adhesive 52 can be applied. Applying an adhesive to a substantially flat or planar tip portion 50, 33 is much easier than applying an adhesive to a narrow, pointed peak that would result if the filter media 22 and reinforcing member 32 were folded at a single score line instead of dual score lines 54. Accordingly, manufacture is greatly eased because less precision is required to place the adhesive 52 atop the planar tip portion 50, 33 of the pleats 44, 34 respectively.

By bonding, gluing or otherwise affixing the planar tip portions 46, 36 to reinforcing strips 28, the filter media 22 is provided with an increased bending strength. Each bottom reinforcing strip 31 is bonded with adhesive 52 to planar tip portion 50 of the truncated pleat tips 46 along the front face 24. Each top reinforcing strip 30 is bonded with adhesive 52 to planar tip portion 33 of the truncated pleat tips 36 along the rear face 26. The adhesive 52 which is used to connect the bottom reinforcing strips 31 to the planar tip portions 50 of the filter media 22 along the front face 24, the top reinforcing strips 30 to the planar tip portions 33 of the truncated pleat tips 36 along the rear face 26, and the pleat-conforming reinforcing member 32 to filter media 22, may be a hot melt Ethylene Vinyl Acetate (EVA) adhesive.

The planar tip portions 50, 33 and the inclined surfaces 48, 38 of filter media pleat 44 and reinforcing member pleat 34 respectively are inclined with respect to each other. As shown in FIG. 3, in one embodiment the distance between adjacent truncated pleat tips of the filter media and reinforcing members across the front or rear face is substantially the same. In an alternative embodiment, the distances between adjacent truncated pleat tips can be varied.

The foregoing detailed description is given primarily for clearness of understanding and no unnecessary limitations are to be understood therefrom for modifications will become obvious to those skilled in the art upon reading this disclosure and may be made without departing from the spirit of the invention and scope of the appended claims.

I claim:

1. An air filter comprising:
a filter media having a plurality of pleats, said plurality of pleats having a plurality of truncated pleat tips each defined by a pair of sloping side surfaces along a front face and a rear face of said filter media, each of said plurality of truncated pleat tips oriented perpendicular to a direction of pleating and configured with a planar tip portion defined by a first and a second score line defining the edges of said truncated pleat tip and extending substantially perpendicular to said direction of pleating;
one or more filter media support structures on said rear face of said filter media and oriented in said direction of pleating, each of said one or more filter media support structures generally contouring to said plurality of truncated pleat tips and each said pair of sloping side surfaces of said filter media on said rear face, each of said one or more filter media support structures thereby having a plurality of truncated pleat tips along said rear face corresponding with said filter media truncated pleat tips; and
one or more first reinforcing strips oriented in said direction of pleating and bonded to said planar tip portions of said plurality of truncated pleat tips of said filter media along said front face, and one or more second reinforcing strips oriented in said direction of pleating and bonded to said plurality of truncated pleat tips of each one of said one or more filter media support structures along said rear face.

2. The air filter of claim 1 wherein each one of said one or more filter media support structures is bonded to said filter media.

3. The air filter of claim 1 further comprising a frame extending onto a portion of said front face and said rear face of said filter media.

4. The air filter of claim 1 wherein said truncated pleat tips of said filter media support structure configured with a planar tip portion.

5. The air filter of claim 1 wherein a distance between said first and second score line of said planar tip portion of said filter media truncated pleats is about 3/32 inches to about 1/4 inches in width.

6. The air filter of claim 5 wherein said distance is about 1/8 inches in width.

7. An air filter system comprising:
a filter media having a plurality of pleats, said plurality of pleats having a plurality of truncated pleat tips each defined by a pair of sloping side surfaces along a front face and a rear face of said filter media, each of said plurality of truncated pleat tips oriented perpendicular to a direction of pleating and configured with a substantially planar tip portion defined by a first and a second score line defining the edges of said truncated pleat tip and extending substantially perpendicular to said direction of pleating;
a filter media support structure on said rear face of said filter media and oriented in said direction of pleating, said filter media support structure generally contouring and bonded to said plurality of truncated pleat tips and each said pair of sloping side surfaces of said filter media on said rear face, said filter media support structure thereby having a plurality of truncated pleat tips along said rear face, each of said plurality of truncated pleat tips of said filter media support structure oriented perpendicular to said direction of pleating and configured with a substantially planar tip portion defined by said first and second score line defining the edges of said support structure truncated pleat tip and extending substantially perpendicular to said direction of pleating; and
one or more first reinforcing strips oriented in said direction of pleating and bonded to said planar tip portions of said plurality of truncated pleat tips of said filter media along said front face proximate said filter media support structure, and one or more second reinforcing strips oriented in said direction of pleating and bonded to said planar tip portions of said plurality of truncated pleat tips of said filter media support structure along said rear face.

8. The air filter as in claim 7 wherein said filter media is disposed within a frame.

9. The air filter as in claim 7 wherein said filter media support structure is bonded to said filter media by a hot melt EVA adhesive.

10. The air filter as in claim 7 wherein a holt melt EVA adhesive bonds said one or more first reinforcing strips to said filter media and said one or more second reinforcing strips to said filter media support structure.

11. The air filter as in claim 7 wherein a distance between said first and second score line of said planar tip portion of said filter media in said direction of pleating is about 3/32 inches to about 1/4 inches.

12. The air filter as in claim 11 wherein said distance is about 1/8 inches.

13. The air filter as in claim 7 wherein said filter media support structure is about 5/8 inches to about 1.0 inches wide.

14. An air filter comprising:
a filter media having a plurality of pleats, said plurality of pleats having a plurality of truncated pleat tips each defined by a pair of sloping side surfaces along a front face and a rear face of said filter media, each of said plurality of truncated pleat tips oriented perpendicular to a direction of pleating and configured with a planar tip portion defined by a pair of spaced score lines formed in said filter media as opposing longitudinal edges of said planar tip portion;
a filter media support structure on said rear face of said filter media and oriented in said direction of pleating, said filter media support structure generally contouring to said plurality of truncated pleat tips and each said pair of sloping side surfaces of said filter media on said rear face, said filter media support structure thereby having a plurality of truncated pleat tips along said rear face, each of said plurality of truncated pleat tips of said filter media support structure oriented perpendicular to said direction of pleating and configured with a planar tip portion;

a first reinforcing strip oriented in said direction of pleating and connected to said planar tip portions of said plurality of truncated pleat tips of said filter media along said front face proximate said filter media support structure, and a second reinforcing strip oriented in said direction of pleating and connected to said planar tip portions of said plurality of truncated pleat tips of said filter media support structure along said rear face; and said filter disposed within a frame.

15. The air filter as in claim 14 wherein said filter media support structure is bonded to said filter media.

16. The air filter as in claim 14 wherein said first reinforcing strip is bonded to said planar tip portions of said plurality of truncated pleat tips of said filter media along said front face.

17. The air filter as in claim 14 wherein said second reinforcing strip is bonded to said planar tip portions of said plurality of truncated pleat tips of said filter media support structure along said rear face.

18. The air filter as in claim 14 wherein said frame extending over opposing ends of each one of said first reinforcing strip and said second reinforcing strip proximate said filter media support structure.

19. The air filter as in claim 14 wherein said spaced score lines are separated a first distance, wherein said first distance is about 3/32 inches to about 1/4 inches.

20. The air filter as in claim 19 wherein said first distance is about 1/8 inches.

* * * * *